(12) United States Patent
Yin et al.

(10) Patent No.: US 6,633,955 B1
(45) Date of Patent: Oct. 14, 2003

(54) FOUR WAY SUPPORT FOR DYNAMIC MIRROR SERVICE POLICY

(75) Inventors: Peng Yin, Grafton, MA (US); Robert S. Mason, Jr., Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 63 days.

(21) Appl. No.: 09/965,421

(22) Filed: Sep. 27, 2001

(51) Int. Cl.[7] .......................... G06F 12/00; G06F 9/00; G06F 3/00; H02H 3/05
(52) U.S. Cl. .................... 711/114; 710/18; 709/105; 714/6
(58) Field of Search ................. 711/112, 162, 711/154, 202, 4, 114; 710/18; 709/105; 714/6

(56) References Cited

U.S. PATENT DOCUMENTS

| 6,112,257 A | | 8/2000 | Mason, Jr. et al. | |
| 6,442,650 B1 | * | 8/2002 | Bachmat | 711/114 |
| 6,487,634 B1 | * | 11/2002 | Bachmat | 711/112 |

OTHER PUBLICATIONS

Performance of a Mirrored Disk in a Real–Time Transaction System by Shenze Chen and Don Towsley published by the University of Massachusetts, pp. 198–207, 1991.

Chained Declustering: Load Balancing and Robustness to Skew and Failures by Leana Golubchik, John C.S. Lui, and Richard R. Muntz published by the University of California, pp. 88–95, 1992.

Correlation Criteria for Logical Volumes, Pending Patent, Application Ser. No. 09/709,077, filed Nov. 10, 2000.

Dynamic Mirror Service Policy with Seek Adjustment in a Non–Physical Mirrored Storage Environment, Pending Patent, Application Ser. No. 09/382,752, filed Aug. 25, 1999.

* cited by examiner

Primary Examiner—Kimberly McLean-Mayo
(74) Attorney, Agent, or Firm—Choate, Hall & Stewart

(57) ABSTRACT

Described are techniques for use in determining a dynamic mirror service policy (DMSP) for a plurality of mirror devices. The DMSP determines which of the plurality of mirror devices services I/O operations associated with a logical volume (LV), such as a read operation, at a particular point in time. The particular DMSP may subsequently be recalculated using device statistics from a different time interval. Part of determining a DMSP includes using device statistics to determine the activity level of each LV. The activity levels of multiple LVs may be combined to determine the activity level associated with a particular mirror device. A mirror device is selected if it has the minimum activity of all the plurality of mirror devices. Seek minimization processing is performed to minimize the distance between LVs stored on a single mirror device. Parameters used in connection with determining a DMSP may be stored in a configuration file and may be dynamically modified. Techniques described may also be used in an embodiment having a static MSP.

38 Claims, 11 Drawing Sheets

| LV # | Selected Mirror Device | Device Location |
|---|---|---|
| LV1 | P1 | L1 |
| LV2 | P2 | L1 |
| LV3 | P3 | L2 |
| LV4 | P4 | L2 |
| LV5 | P4 | L3 |
| LV6 | P3 | L3 |
| LV7 | P2 | L4 |
| LV8 | P1 | L4 |

FIGURE 7

| LV # | Selected Mirror Device | Device Location |
|------|------------------------|-----------------|
| LV1  | P1 | L1 |
| LV2* | P1 | L1 |
| LV3* | P2 | L2 |
| LV4  | P4 | L2 |
| LV5  | P4 | L3 |
| LV6  | P3 | L3 |
| LV7* | P3 | L4 |
| LV8* | P2 | L4 |

FIGURE 8

| LV # | Selected Mirror Device | Device Location |
|---|---|---|
| LV1 | P1 | L1 |
| LV2 | P1 | L1 |
| LV3 | P2 | L2 |
| LV4 | P2 | L2 |
| LV5 | P3 | L3 |
| LV6 | P3 | L3 |
| LV7 | P4 | L4 |
| LV8 | P4 | L4 |

FIGURE 9

FOUR WAY SUPPORT FOR DYNAMIC MIRROR SERVICE POLICY

BACKGROUND

1. Technical Field

This application generally relates to computer systems, and more particularly to mirrored storage systems.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

One problem in servicing data operations is providing an efficient arrangement and technique for storing and maintaining copies of data on mirror devices. Mirror devices may store copies of data, for example, in the event of device failure, or other problems. A system may have one or more mirror devices associated with each single data device in which each of the mirror devices maintains a copy of data included in the single data device. Just as efficient techniques may be used in connection with handling a data request, efficient techniques may be used in connection with determining which one or more mirror devices service requests, such as read data requests, for a particular logical device.

Thus, it may be desirous and advantageous to have an efficient technique in determining an arrangement of mirror devices.

SUMMARY OF THE INVENTION

In accordance with one aspect of the invention is a method executed in a computer system for selecting a mirror device from a plurality of mirror devices for a logical volume comprising: collecting activity data of said at least one logical volume; determining an activity level of each of said plurality of mirror devices; selecting one of said plurality of mirror devices to service said logical volume in accordance with a load balancing policy of said mirror devices, said logical volume being one of a plurality of logical volumes; and performing seek minimization processing that includes swapping first and second mirror devices in accordance with predetermined criteria, said first mirror device being selected to service requests of a first by logical volume and said second mirror device being selected to service requests of a second logical volume, said predetermined criteria including a first identifier associated with said first associated mirror device that does not correspond to a second identifier associated with a location on said first mirror device identifying a location at which a mirrored portion of said first logical volume is to be stored.

In accordance with another aspect of the invention is a computer program product for selecting a mirror device from a plurality of mirror devices for a logical volume comprising machine executable code for: collecting activity data of said at least one logical volume; determining an activity level of each of said plurality of mirror devices; selecting one of said plurality of mirror devices to service said logical volume in accordance with a load balancing policy of said mirror devices, said logical volume being one of a plurality of logical volumes; and performing seek minimization processing that includes swapping first and second mirror devices in accordance with predetermined criteria, said first mirror device being selected to service requests of a first logical volume and said second mirror device being selected to service requests of a second logical volume, said predetermined criteria including a first identifier associated with said first associated mirror device that does not correspond to a second identifier associated with a location on said first mirror device identifying a location at which a mirrored portion of said first logical volume is to be stored.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example of a table of selected mirror devices and corresponding information associated with logical volumes prior to performing seek minimization processing;

FIG. 8 is an example of an updated table of selected mirror devices and corresponding information associated with logical volumes in accordance with predetermined criteria for seek minimization processing;

FIG. 9 is an example of the updated table at a later point in time than that of FIG. 8 in performing seek minimization processing;

DETAILED DESCRIPTION OF EMBODIMENT(S)

Figure 1:
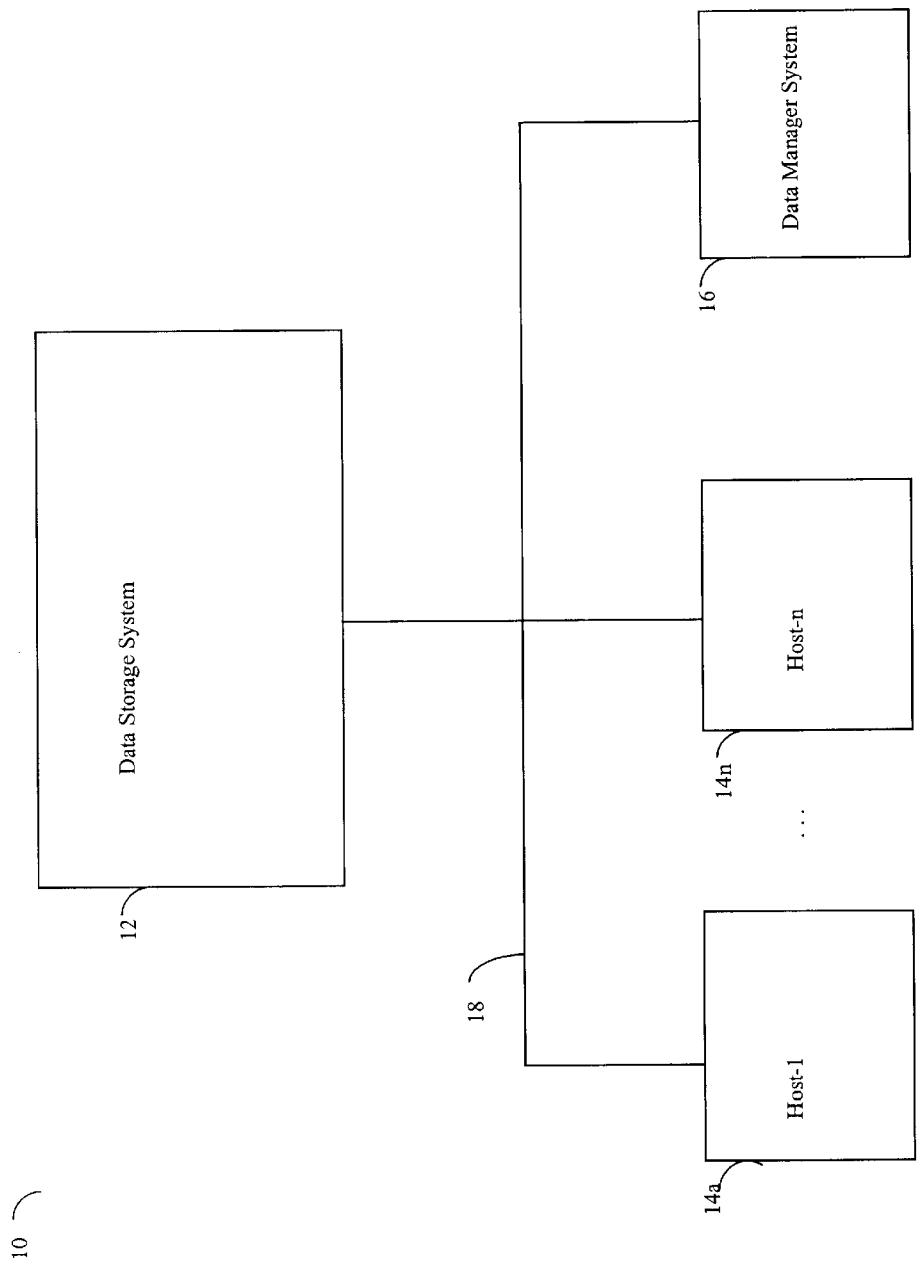
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
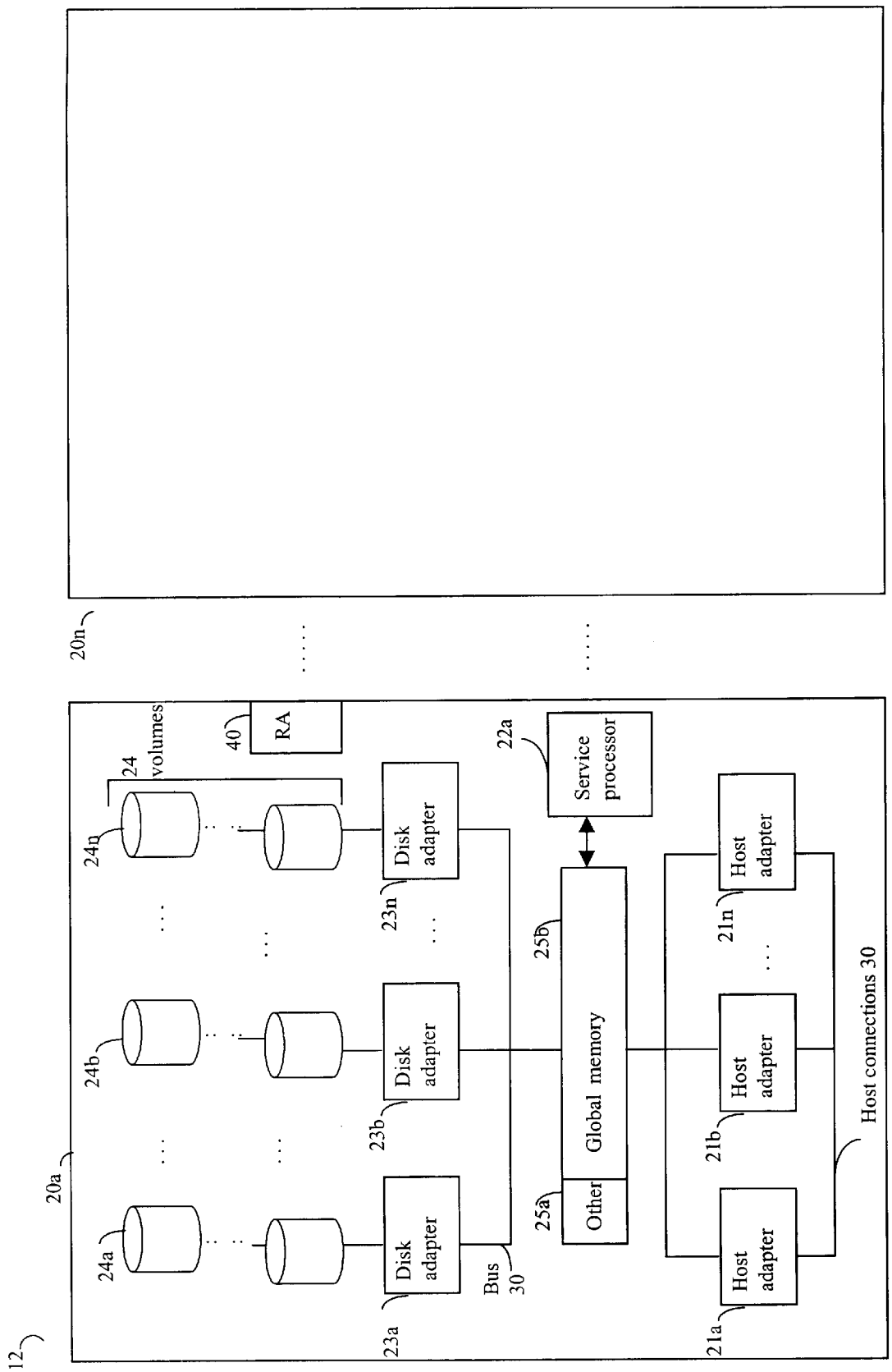
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the global memory 25b, for example, in communications with other disk processors or directors, and other components of the system 20a. Generally, the global memory 25b may be used in facilitating communications between components in the system 20a.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass..

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests and related I/O operations for multiple LVs that may reside on a disk.

Figure 3:
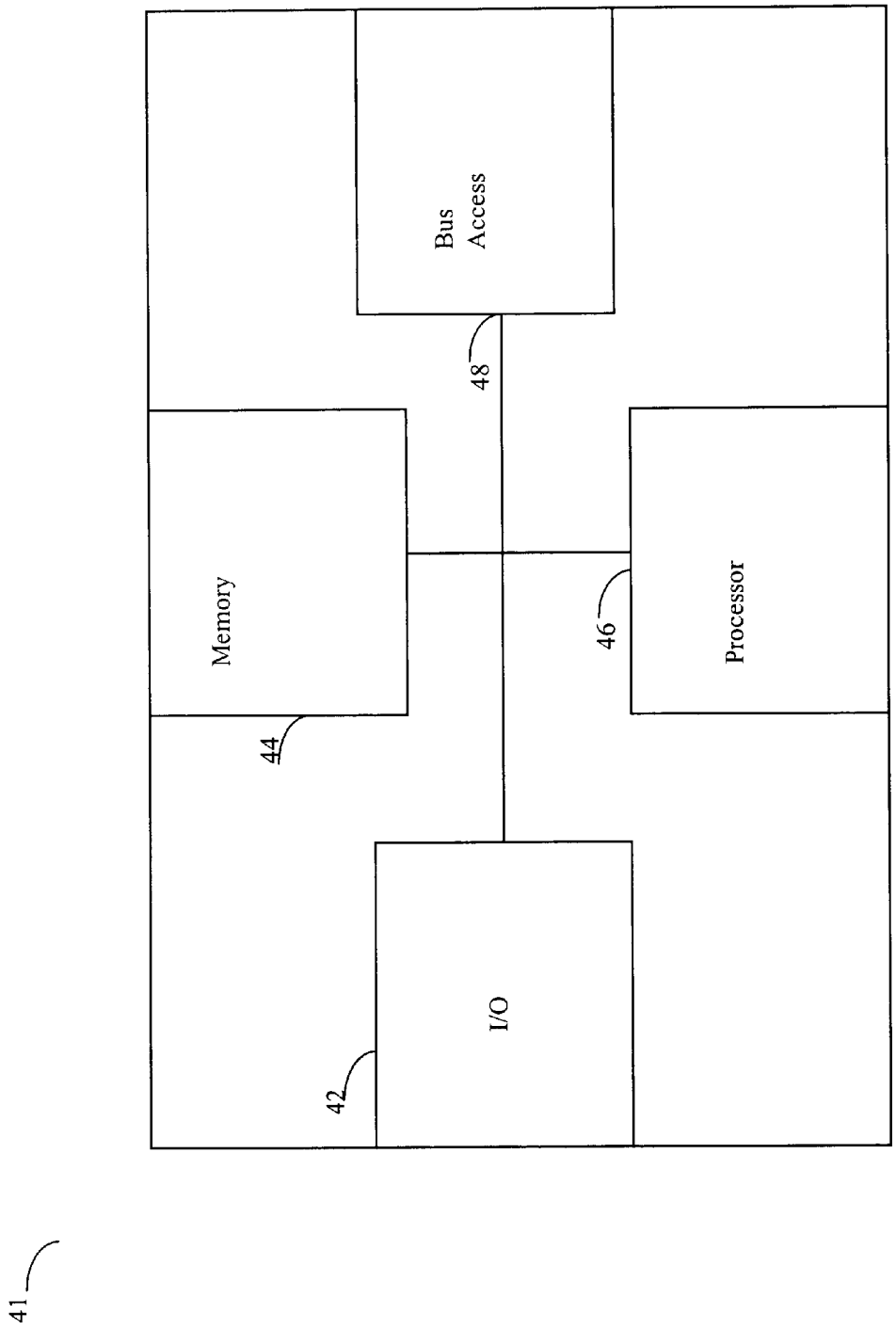
FIG. 3 is an example of more detail of one embodiment of a disk adapter (DA)

Referring now to FIG. 3, shown is a more detailed illustration of what may be included in one embodiment of a DA, such as a DA 23a. Each DA 50 may include a processor 46, local memory 44, I/O interface circuitry 42, and bus access circuitry 48. The local memory 44 is coupled to the processor 46 and includes local data used by the DA 50. The memory may include volatile portions that are read to, and written from, by the processor 46 and non-volatile portions that contain data used by the processor 46. It should be noted that the processor may be a conventional processor that performs functions for the DA as described herein.

The I/O interface circuitry 42 may be used in receiving and sending data, for example, between the DA and a volume(device) and other elements of the data storage system. The I/O interface circuitry 42 and the bus access circuitry 48 are coupled to and controlled by the processor 46 in connection with data operations between the DA and other portions of the data storage system. In particular, the bus access circuitry provides the DA with access, for example, to the bus 30 in connection with performing data transfer operations with other DAs and global memory.

In operation, each of the host computers 14a–14n may send commands to one or more of the data storage devices requesting data stored in one of the LVs, or providing data to be written to one or more of the LVs. A host computer may, for example, write data to a particular LV through the use of one of the HAs which further places the data, for example, in global memory 25b. The appropriate DA may read the data from the global memory and write it to the appropriate LV. Similarly, steps may be taken for data which is read and sent to one of the host computer systems.

An embodiment may maintain multiple copies of an LV on different physical devices. These multiple copies of the LV may be referred to as mirrored copies. It should be noted that an embodiment may include any number of mirrored copies of a particular LV, such as 4, for example. It should be noted that an embodiment may also include more or less than 4 mirrored copies on one or more physical devices.

Any one or more of the mirrored copies of data may be used when responding to a read request, for example. Accordingly, implemented among the various DAs that may be included in the system as described herein, a mirror service policy or MSP may identify which of the DAs is responsible for processing an I/O request in connection with a particular LV as may be received from a host computer. As will be described herein, a dynamic mirror service policy (DMSP) may be implemented in which the service policy may be modified periodically in accordance with system performance and monitoring statistics, for example, such as those used in describing the nature of the read and/or write requests within the data storage system. The MSP within a particular embodiment may be modified periodically during the operation of the data storage system making it a DMSP.

Generally, as will be described herein, a DMSP may specify at a particular point in time for each LV which of the DAs is responsible for reading data requests as may be received, for example, from a host computer system. Writing data requests may be handled differently and be handled by all mirrors rather than routed to particular ones for handling as with a read request. A new DMSP may be specified at some later point in time using new data in connection with device I/O statistics since the last time a DMSP was determined.

It should be noted that an embodiment may include any one or more of a variety of different factors and parameters, for example, as may be obtained from monitoring the system in determining a particular policy decision. These factors may include, for example, activity level of different mirror devices involved, as well as different activity level aspects within a single system.

In one embodiment, the activity level may be determined for each LV stored on a particular mirror device. Activity level data may be aggregated for all of the LVs on a particular mirror device to determine the activity level about a particular physical device. For a given time interval, for each LV, the LV activity per second in connection with various I/O requests may be represented as:

$$LV \text{ activity} = (1 *\text{\# of read requests} + 0.5 *\text{\# of write requests} + 0.25 *\text{\# of prefetched tracks})/(\text{time of interval}) \quad \text{(Equation 1)}$$

The foregoing formula represents a weighted activity level in which a factor is associated with the different types of I/O requests and accesses included therein. This is called an LV activity unit in pending U.S. patent application Ser. No. 09/709,077 filed on Nov. 10, 2000, entitled "Correlation Criteria for Logical Volumes", by Levin-Michael et al. which is herein incorporated by reference. In the foregoing equation, the number of read requests corresponds to the number of read-miss accesses. "Prefetched tracks" may refer to the number of sequential read accesses, for example, as may be performed in connection with prefetching more than one portion of data for a request for one portion of data. Other embodiments may include different I/O requests and use different weighting factors. It should be noted that the data used in connection with determining LV activity as may be calculated above may be obtained, for example, using performance data monitoring software that may be included in an embodiment of a service processor, DA, and the like as may be included in a Symmetrix™ system.

An MSP defines when a particular mirror device is responsible for servicing a particular LV. As known to those of ordinary skill in the art, MSPs may be implemented in an embodiment, for example, that includes an interleaved mirror service policy in which different mirror devices alternate which cylinders of a logical volume they each serve. Similarly, an embodiment may include any one or more other MSP, for example, as described in issued U.S. Pat. No. 6,112,257, entitled "Dynamic Adjustment of Mirror Service Policy for Logical Volumes in a Disk Drive System Based on Collected Statistics", to Mason, Jr. et al., as assigned to EMC Corporation of Hopkinton, Mass., which is herein incorporated by reference.

As will be described herein, an embodiment may implement a DMSP within the micro code, for example, of a DA. In one embodiment, a single DA may determine the DMSP. A single DA may then communicate the particular DMSP by placing policy data in global memory, for example, as described in connection with FIG. 2. A broadcast message may be sent, for example, to all other DAs to use the policy data in the global memory. Thus, each of the other DAs may obtain a copy and read the particular DMSP data from global memory as determined by the single master DA. Different synchronization techniques may be used such that all of the DAs use the same copy and obey the same DMSP. For example, an embodiment may have a brief pause during which all DAs obtain the new DMSP data from global memory.

An embodiment may use any one of a variety of different configurations in connection with gathering statistics. An embodiment may have each DA obtain and store its own statistics as this may increase efficiency when machine executable code using these statistics executes within each DA. Statistics that may be gathered using, for example, in determining the activity level for determining a DMSP may be those statistics as obtained by the service processor 22a. Each of the DAs may store and write its own statistics to the global memory as well as obtain any one or more of the other DA statistics and information. Thus, global memory may be used as a means for communicating the different statistics of the different DAs, for example, to the single master DA that determines the DMSP and associated data. Additional data transfers may be used to communicate data to/from the service processor. As will be described herein, one or more thresholds may be established as a parameter, for example, in a configuration file and may also be dynamically modified in connection with determining the DMSP in a particular embodiment. This as well as other details of the DMSP are described in paragraphs that follow.

Figure 4:
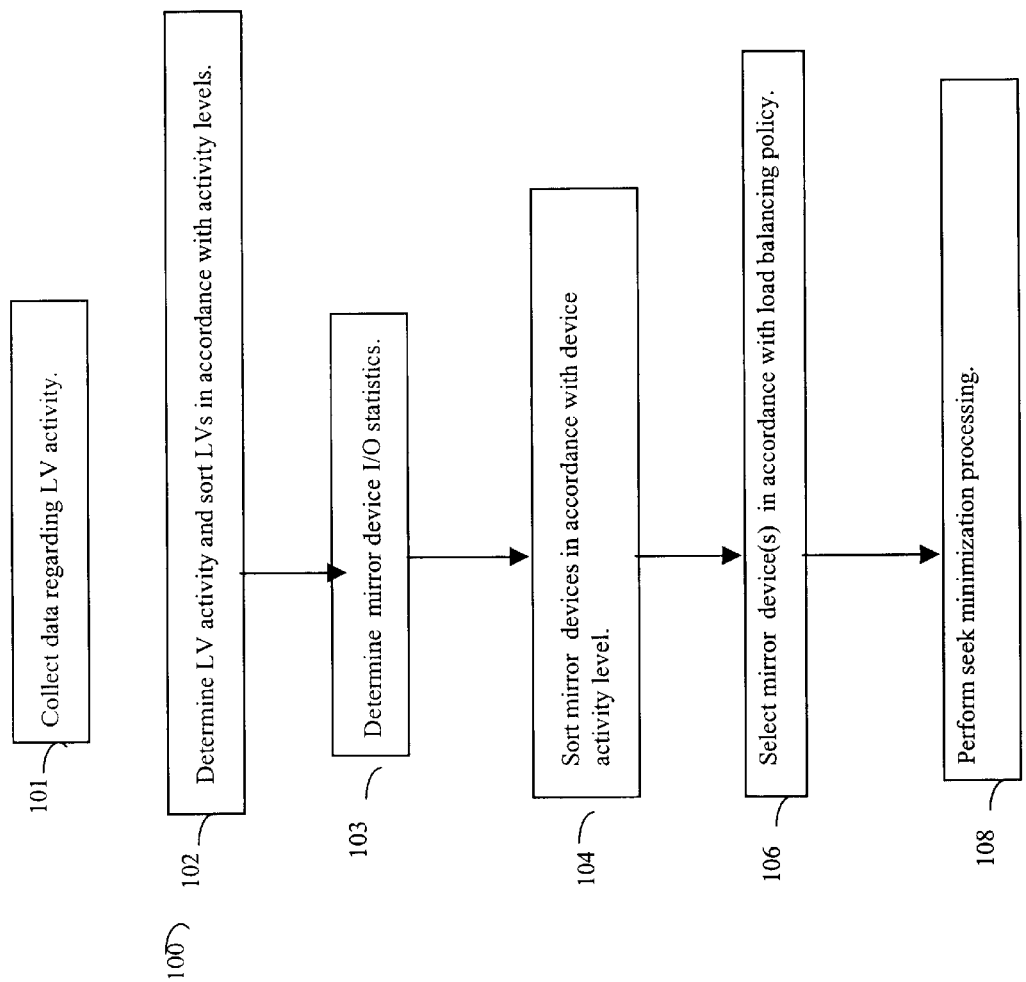
FIG. 4 is a flowchart of method steps of one embodiment for determining a dynamic mirror service policy defining which mirror device services requests for a particular logical volume.

Referring now to FIG. 4, shown are steps of an embodiment in the flowchart 100 that may be used in determining a DMSP of a particular system such as, for example, in connection with the system 10 of FIG. 1. The steps that will be described in connection with flowchart 100 are those, for example, that may be executed by a DA such as one of 23a–23n described in connection with FIG. 2.

At step 101, data may be gathered that is used in determining the LV activity level, for example, using Equation 1 described in more detail elsewhere herein. Each of the DAs may collect the different data and statistics, for example, in connection with the activity level of each of the LVs included in each of its devices. At step 102, the activity level of each LV is determined and the LVs are then sorted in accordance with the associated activity level. An embodiment may use a formula, for example, as described in Equation 1 included elsewhere herein in collecting device statistics to determine the activity level of a particular LV. Thus, an embodiment using the criteria for activity in Equation 1 described elsewhere herein may gather data in connection with I/O operations such as the number of read operations, write operations, and the like as used in Equation 1. At step 103, the activity level of the mirror device(s) may be determined, for example, using the LV activity levels determined at step 102. The activity level of each LV residing on a particular mirror device may be combined, such as by summation, to determine an aggregate activity level of the particular mirror device.

At step 104, the mirror devices may be sorted in accordance with mirror device activity level. At step 106, one or more mirror devices may be selected in accordance with the load balancing policy and criteria of the system. For example, in one embodiment at step 106, those physical mirror devices having the least or minimum activity level may be selected to be paired with one or more LVs as a mirror device. At step 108, seek minimization processing may be performed. Generally, as will be described in more detail in paragraphs that follow, seek minimization processing attempts to minimize the seek time between LVs that reside on the same physical mirror device.

Figures 5A, 5B:
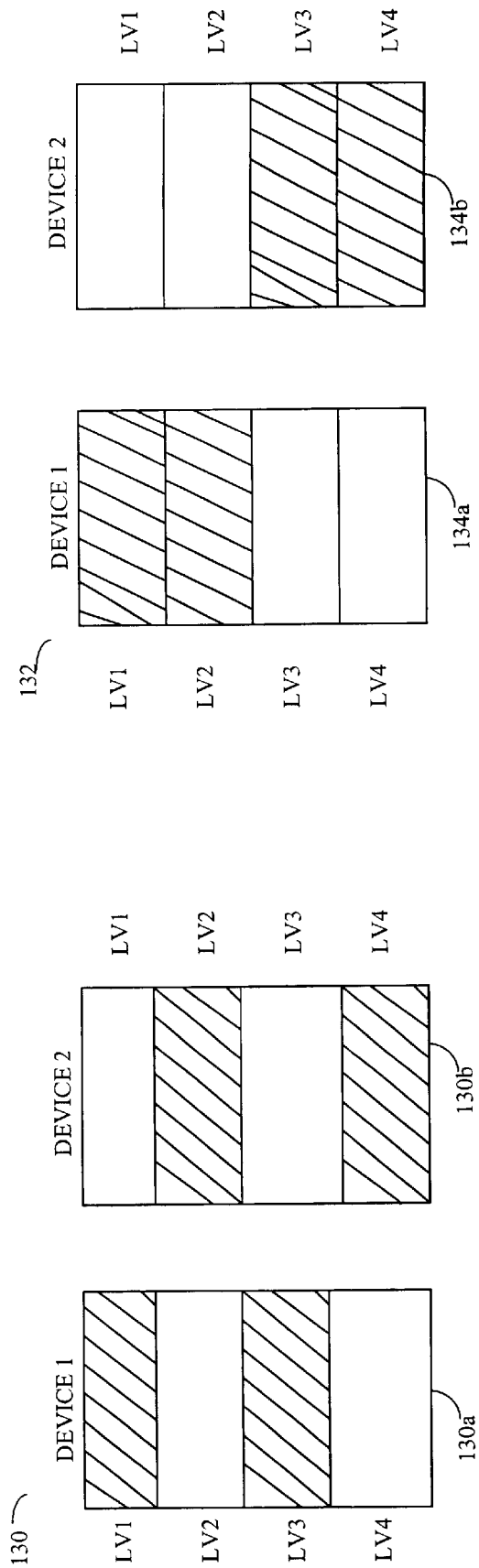
FIG. 5A is an example of an arrangement of logical volumes on mirror devices.
FIG. 5B is another example of an arrangement of logical volumes on mirror devices preferred over that arrangement of FIG. 5A.

Referring now to FIGS. 5A and 5B, what will now be described is an example of a preferred arrangement of LVs in connection with data storage devices for seek minimization.

Referring now to FIG. 5A, shown is an arrangement 130 of two mirror devices—Device 1 and Device 2. Device 1 130a is a first mirror device having an arrangement in which data read requests associated with LV1 and LV3 are serviced by physical mirror device 1. Similarly, mirror device 130b device 2 services data read requests associated with LV2 and LV4 as also shown in FIG. 5A. It should be noted that the arrangement of FIG. 5A may not be preferred in connection with an embodiment that wishes to have a minimal seek time between LVs serviced by the same physical device.

Referring now to FIG. 5B, shown is a preferred arrangement over that of FIG. 5A in connection with mirror devices. As may be shown in connection with the arrangement 132, the first mirror device 134a includes two LVs that are in closer proximity then as described in connection with element 130a of FIG. 5A. Similarly, the LVs residing on the second physical device—Device 2 134b—are closer in proximity then the arrangement of data of Device 2 130b of FIG. 5A.

What will now be described is an embodiment which includes eight LVs and a four-way mirror support arrangement having four mirror devices. It should be noted that these numbers are selected for a particular example and are not meant to limit the principles and techniques described herein. An embodiment may include any number of mirror devices as well as any number of LVs which make use of one or more mirror devices.

Figure 6:
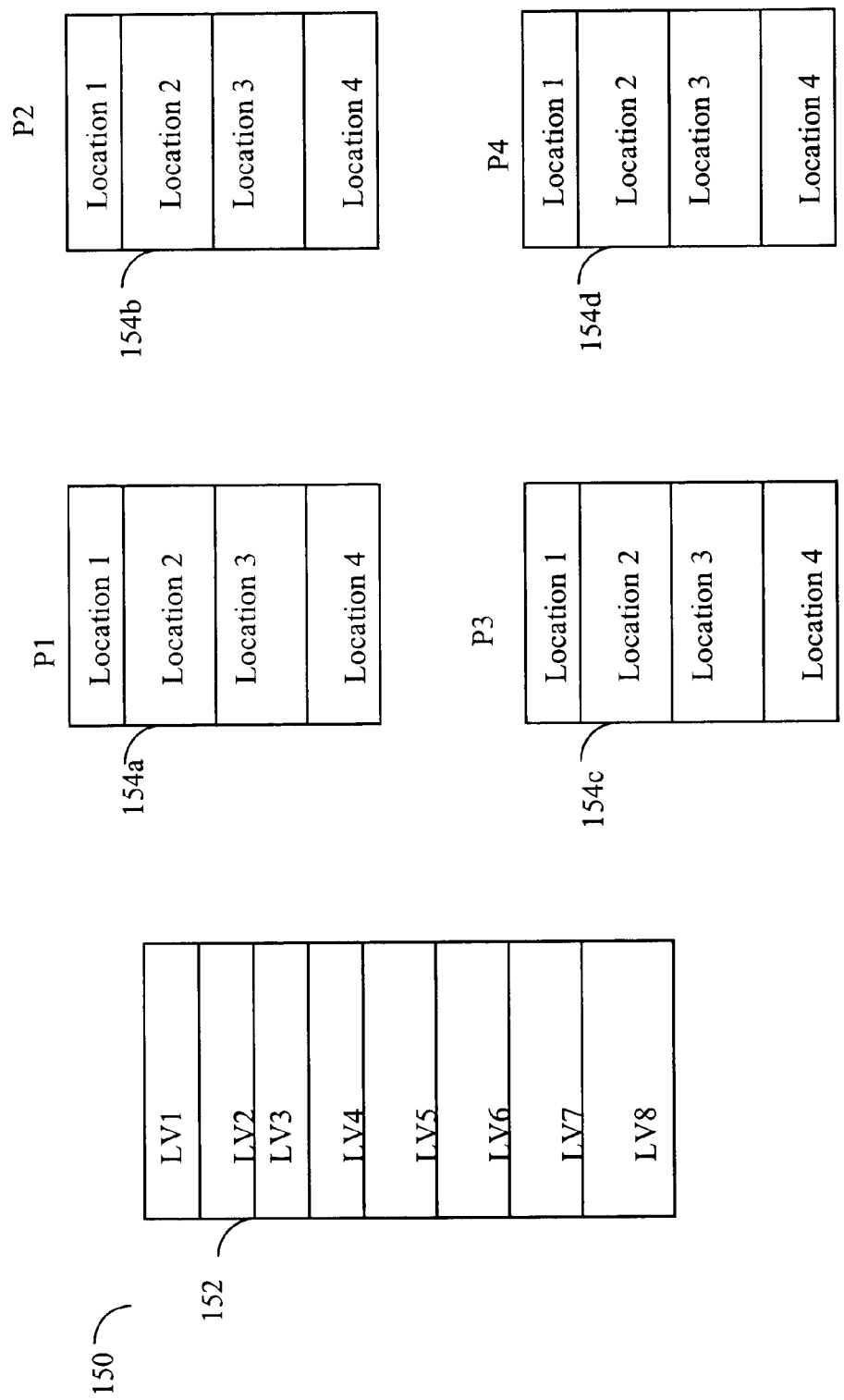
FIG. 6 is an example of an arrangement of logical volumes and mirror devices.

Referring now to FIG. 6, shown is an arrangement of 8 LVs 152 for which a particular mirror device must be selected out of P1 through P4. In this example, each one of the mirror devices P1 through P4 is divided into four (4) locations in which each location may store two LVs. It should be noted that other embodiments may include a different number of locations with identifiers. In this example, four locations are used since it is assumed that each LV has four mirrors or four copies, and each LV is assumed to have the same number of mirrors. Additionally, an embodiment may store or associate one or more LVs with each location or portion of a physical mirror device, such as P1 through P4, other than as described in this example.

It should be noted that the particular location selected within a particular mirror device may be determined in accordance with information stored in a system configuration file. The system configuration file may include information such as the particular location as well as other data values that may be used in connection with an embodiment's DMSP or MSP, for example, such as a threshold value described elsewhere herein. An embodiment may use other techniques in connection with selecting a particular location within a mirror device. In one embodiment, the location of each logical device may be determined at configuration time using information initially included in the configuration file defining where each logical device resides on each physical mirror device.

Referring now to FIG. 7, shown is an example of a set of selected mirror devices associated with particular LVs resulting from execution of step 106 as previously described in connection with FIG. 4. It should be noted that each of the devices, P1 through P4, has been selected at a particular point in time using different activity criteria. For example, mirror device P1 was selected because it had the minimal activity level out of all devices P1 through P4. Subsequently, the activity level of each of the mirror devices may again be determined after LV1 is associated with mirror device P1. P2 has the minimum activity level and is associated with LV2. Similarly, each of the activity levels of each of the physical mirror devices P1 through P4 may be updated with each iteration of associating a particular LV with a particular mirror device.

The table 160 includes rows of information regarding a plurality of LVs. It should be noted that each LV is included in column 162 and has an associated mirror device as indicated on the same line in column 164. Similarly, a particular device location is indicated in column 166 on the same line as the particular LV specifying a particular location within the selected mirror device.

What will now be described in more detail are the processing steps that may be associated with step 108 as previously described in connection with FIG. 4 in performing seek minimization processing.

It should be noted that in connection with the following description of "swapping", it is the "preferred mirror device" that is swapped. As described elsewhere herein, an LV may have multiple mirrors or copies. Each of the copies may be stored on a different physical mirror device. At a first point in time, a first mirror device may be selected as a preferred mirror device from the multiple mirror devices. The preferred mirror device may serve read requests associated with an LV at the first point in time. At a later second point in time, a second preferred mirror device may be determined from the multiple mirror devices to service read requests associated with the LV. The preferred mirror device specifies which physical device copy of an LV handles read requests of the LV at a point in time. When a preferred mirror is swapped, a different physical mirror device is selected to service read requests of a particular LV. The location of an LV (L(A)) in the following description does not change, only the preferred mirror device (P(A)). It should be noted that more than one mirror device may be selected to service requests for a single LV, for example, in an embodiment that includes an interleaved policy in which two mirror devices service requests at the same time.

As an input to step 108, seek minimization processing may use the information included in an embodiment, such as in table 160. Generally, a selected mirror device and associated device location may be a candidate to be swapped with another associated mirror device and device location if the following holds true:

$$P(A) \neq L(A) \quad \text{(Equation 2)}$$

in which:

"P(A)" refers to an identifier associated with the preferred mirror device A (in this example, identifier is "n", such that 0<n<5, and associated with, respectively, one of P1–P4); and "L(A)" refers to the location having an associated identifier which is "n".

Generally, Equation 2 represents the condition that, for a particular mirror device, the preferred mirror of device A does not equal the location of device A.

Once a first swap candidate has been determined, a second LV may be determined to serve as the second device of the swap pair. A second device may be a candidate to be swapped with a first device if:

$$P(B) \neq L(B) \text{ AND } P(B) = L(A) \quad \text{(Equation 3)}$$

in which

"P(B)" refers to an identifier associated with the preferred mirror device B (in this example, identifier is "n", such that 0<n<5, and associated with, respectively, one of P1–P4);

"L(B)" refers to the location having an associated identifier which is "n"; and

"L(A)" is as described elsewhere herein.

It should be noted that what is being swapped are the preferred mirror devices of each candidate.

Using the foregoing equations 2 and 3, a pair of LVs may be determined which may be referred to as a swap pair. In other words, the foregoing equations 2 and 3 are rules that may be used in connection with determining a pair of LV candidates having preferred mirror devices to be swapped.

A third rule or condition may also be used in connection with those specified in connection with equations 2 and 3 to determine if two devices LVA and LVB are candidates having preferred mirrors that may be swapped. The third condition or criteria to be met for a swap pair LVA and LVB to be swapped is that the activity level of the two devices relative to one another be within a particular threshold. In other words, device LVA and device LVB may be swapped in this embodiment if their activity levels are approximately the same. The activity level of a particular LV, such as one of LV1 through LV8, may be determined for example using that as specified in connection with Equation 1. Another embodiment may also use any one of a variety of other criteria that may be used in connection with determining the activity level of an associated device. Additionally, the activity level of LVA and LVB may be within a particular threshold. Values for the particular threshold may be specified, for example in a configuration file. The threshold value may be a dynamic parameter that may be modified by a user and may vary in accordance with each particular embodiment. For example, an embodiment may select a threshold from within the range of 100–1000 I/O operations/second. The threshold value for an embodiment may vary in accordance with the activity level of devices in each particular embodiment.

The activity level of two LVs, LV1 and LV2, may be represented as follows:

$$|\text{Activity}(LV1) - \text{Activity of }(LV2)| < \text{Threshold} \quad \text{(Equation 4)}$$

in which:

"Activity (LV1)" represents the activity level of LV1;

"Activity (LV2)" represents the activity level of LV2; and

"Threshold" may represent a threshold value of maximal acceptable difference in activity level as between devices LV1 and LV2.

In the embodiment, the condition specified in Equation 4 holds in order for preferred mirrors for of the pair of two LVs to be swapped. The activity level associated with a particular LV may be determined, for example, using the activity specified in accordance with Equation 1 or another measure of activity that may be used in an embodiment. Other embodiments may also use different and/or additional criteria in determining the activity level of an LV.

What will now be explained is an example using table 160 in connection with determining one or more swap pairs (LV1, LV2) having respective mirror devices (A,B) that may be swapped using the foregoing techniques and rules. For simplification in this example, it is assumed that any two LV candidates selected have an activity level difference which is within a predetermined threshold value that is in accordance with the condition specified in Equation 4. In the following example, LVs are examined sequentially in the order specified in the table. However, it should be noted that another ordering may be used to examine elements in the table 160.

Examining LV1 and applying Equation 2, it is determined that P1=L1 and LV1 and associated mirror device is not a swap candidate. Examining LV2 and applying Equation 2, it is determined that P2<>L1 making LV2 and its mirror device a candidate. A second LV, B, may be determined as a match for L1 in accordance with Equation 3 such that:

$$P(B) \neq L(B) \text{ AND } P(B) = L(A)$$

which is:

$$P(B) \neq L(B) \text{ AND } P(B) = P1.$$

Examining LVs sequentially in the table 160, LV8 meets the condition in Equation 3 and LV2 and LV8 may be swapped. This is, the mirror devices associated with LV2 and LV8 have the data locations associated with LV2 and LV8 swapped.

Examining LV3, it is determined that P3<>L2 and LV3 is a first swap candidate, A. A second LV, LV7, is determined which satisfies Equation 3 having P2 as a match for L2. Thus, the respective mirrors of LV3 and LV7 may be swapped.

Figure 8:
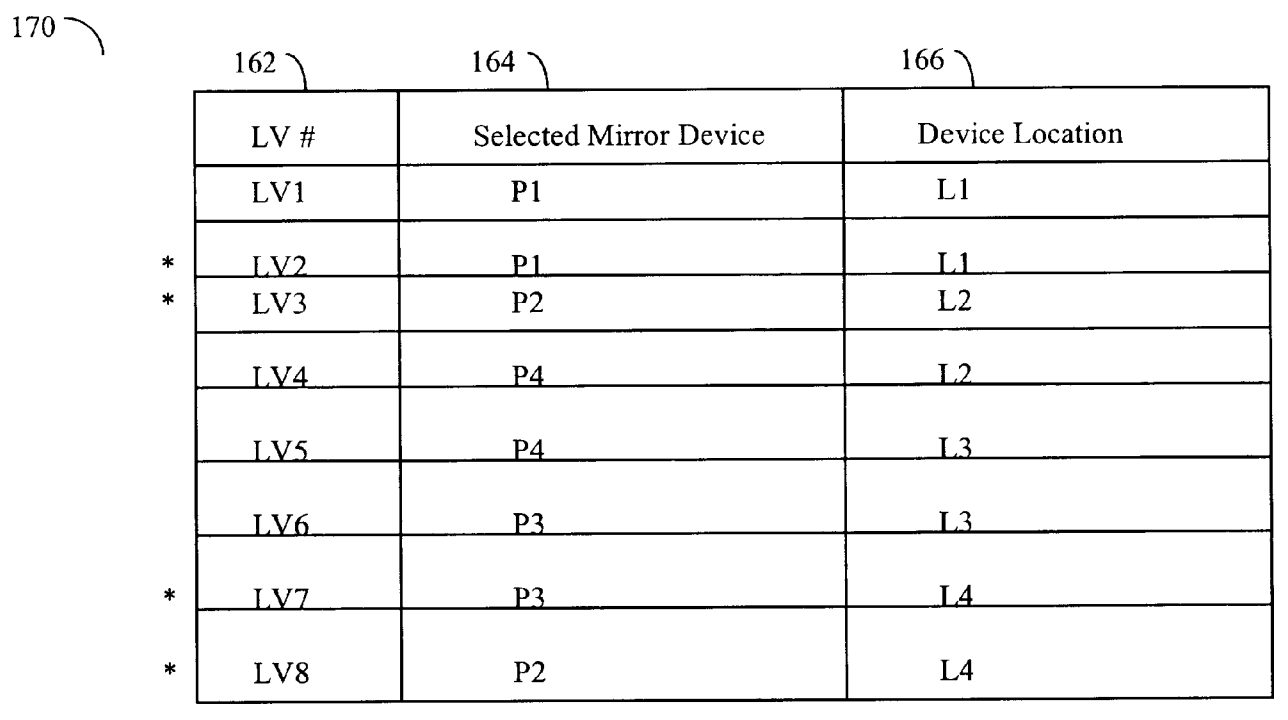

Prior to proceeding further with this example, an updated table is shown is FIG. 8 with the two foregoing swaps being performed swapping the associated mirror device between candidates A and B of the pair. It should be noted that the 4 LVs of the two swap pairs have a "*" to the left of the corresponding row entry in the table 170.

Figure 10:
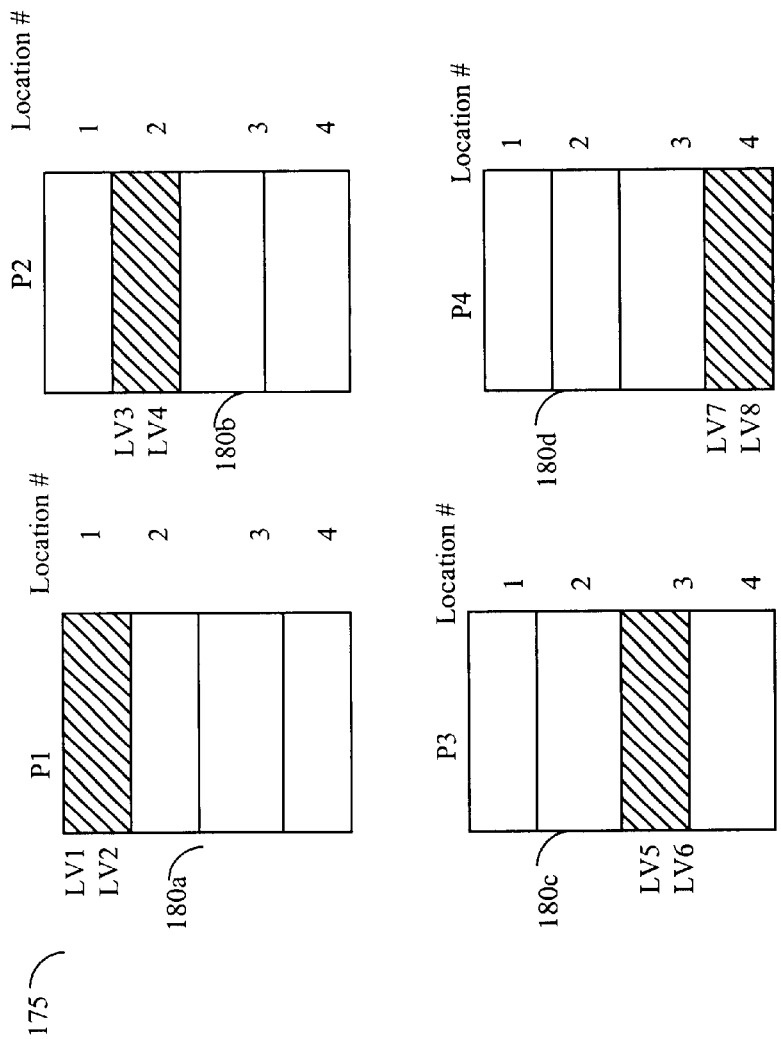
FIG. 10 is an example of an arrangement of logical volumes on mirror devices subsequent to performing seek minimization processing.

Proceeding further, LV4 and LV8 may be swapped, and LV5 and LV7 may be swapped. The resultant configuration may be represented as shown in table 172 of FIG. 9. The four LVs, LV4, LV5, LV7 and LV8, of the two swap pairs have a "*" to the left of the corresponding row entry in the table 172. The particular LV arrangement 175 of mirror devices P1–P4 may be illustrated as represented in FIG. 10 in which the foregoing applied techniques may be used to minimize seek time between LVs serviced by the same physical mirror device. In particular, FIG. 10 has shaded portions of physical devices indicating which portions correspond to the "preferred mirror" for LVs. For device P1 180a, Location1 is shaded indicating that this is the preferred mirror for LV1 and LV2. For device P2 180b, Location 2 is shaded indicating that this is the preferred mirror for LV3 and LV4. For device P3 180c, Location 3 is shaded indicating that this is the preferred mirror for LV5 and LV6. for device P4, 180d, Location 4 is shaded indicating that this is the preferred mirror for LV7 and LV8.

It should be noted that the although the foregoing example included a single iteration through all LV elements, an embodiment may perform any number of iterations through the LV elements. Once a first LV candidate LV1 was found in the foregoing example, a second candidate LV2 was determined as the first LV meeting the conditions specified in Equations 3 and 4. An embodiment may also determine all possible candidates prior to selecting a particular second candidate, LV2.

It should be noted that the foregoing may also sort the LVs by increasing activity level, such as in connection with step 103 processing, prior to performing processing associated with step 108 for seek minimization. Then, after determining LV1 and determining a second LV2 satisfying the conditions in Equations 3 and 4, the first LV2 candidate satisfying Equations 3 and 4 criteria will also be the LV having the minimum activity level difference with LV1.

Figure 11:
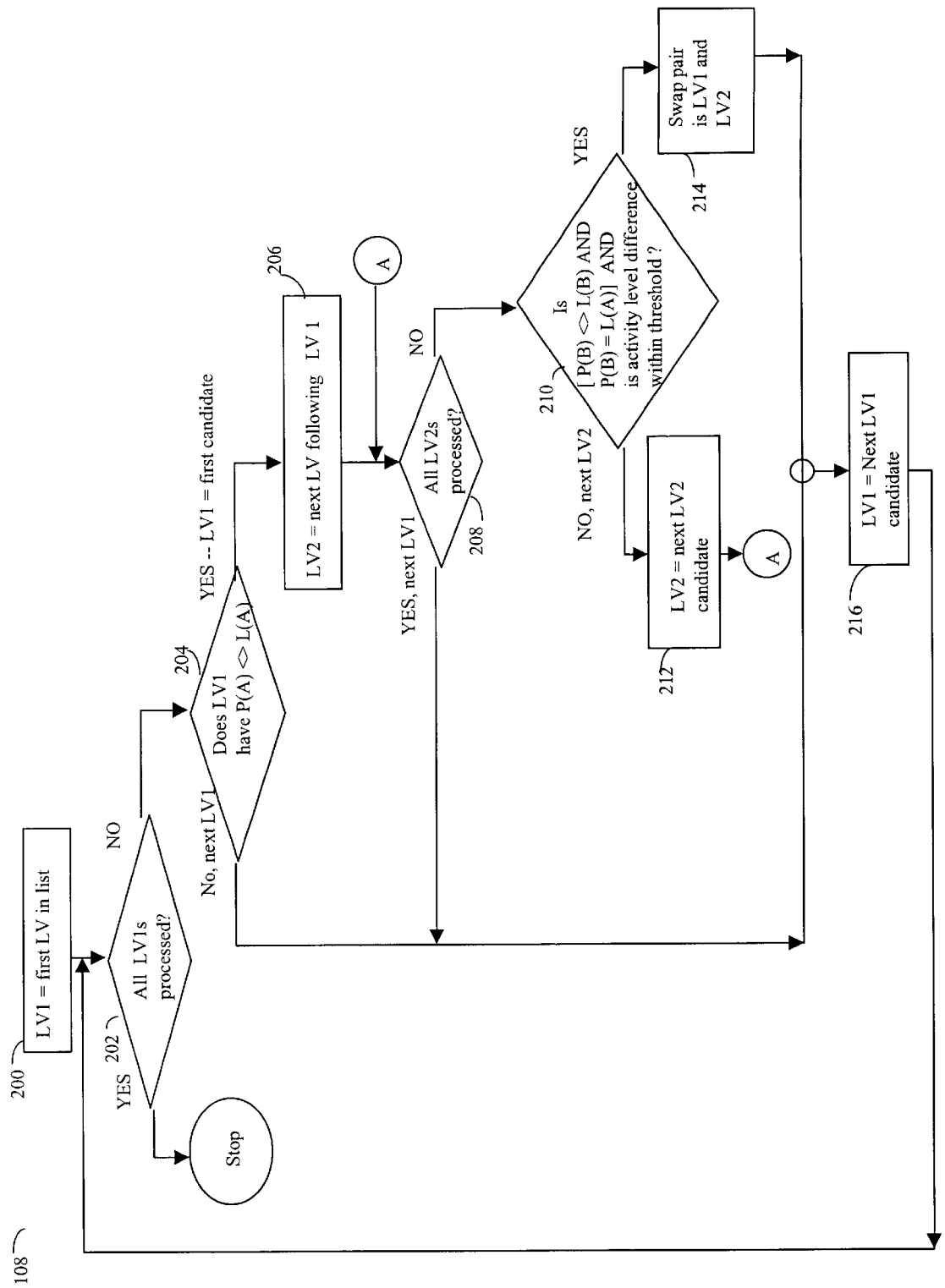
FIG. 11 is a flowchart of steps of one embodiment for performing seek minimization processing.

Referring now to FIG. 11, shown is a flowchart of steps of one embodiment for performing seek minimization processing as described herein. As used in connection with the flowchart 108, LV1 and LV2 refer to the first and second LVs, respectively of a swap pair whose corresponding mirror devices are swapped. At step 200, LV1 is assigned to be the first LV1 candidate. At step 202, a determination is made as to whether all LV1 candidates have been processed. If a determination is made that all LV1 candidates have been processed, the method stops. Otherwise, control proceeds to step 204 where a determination is made in accordance with the condition set forth in Equation 2 described elsewhere herein. If it is determined that P(A)<>LV(A) for the current LV1 candidate, control proceeds to step 216. Otherwise, control proceeds to step 206 where LV2 is assigned to the first LV2 candidate which, in this example, is the first LV following LV1. At step 208, a determination is made if all LV candidates have been processed. If so, control proceeds to step 216 to determine the next LV1 candidate. Otherwise, control proceeds to step 210 where a determination is made if the LV2 candidate and LV1 candidate are also in compliance with the conditions set forth in Equations 3 and 4. If conditions of Equations 3 and 4 are met, control proceeds to steps 214 where LV1 and LV2 are swapped, and to step 216. Otherwise, control proceeds to step 212 to determine the next LV2 candidate and control then proceeds to step 208 to continue processing of all LV2 candidates.

Continuing subsequent to determining NO at step 204 condition, determining YES at step 208 condition, and following step 214, at step 216, the next LV1 candidate is determined. Control proceeds to step 202 where LV1 processing begins with the current LV1 candidate.

It should be noted that the steps described in connection with FIG. 11 may be adapted for use in embodiments using variations of the techniques described herein as known to those of ordinary skill in the art. For example, an embodiment may perform a single iteration through all LVs or multiple iterations.

The foregoing provides a flexible and efficient technique for dynamically determining a mirror service policy in accordance with the state of the system at a particular point in time. The state of the system may be measured using any one or more of a variety of activity level and other statistics, such as specified in Equation 1 for example, that may be gathered by each DA and communicated to other DAs as needed. An embodiment may designate a single DA as the DMSP determiner or master. One or more alternate "masters" may also be specified in the event that a first designated DA experiences failure or problems.

An embodiment may also partition performing different processing steps among multiple DAs. Intermediate data, activity and statistical information may be communicated between DAs using global memory.

It should be noted that the foregoing describes a "dynamic" mirror service policy that may change, the foregoing techniques may also be included in an embodiment using a static mirror service policy.

Additionally, the foregoing techniques may be used in an embodiment having any one of a variety of different mirroring policies as known to those of ordinary skill in the art. For example, an embodiment may also use an interleave policy whereby the mirrors alternate which cylinders of a particular LV are served. Whether an LV uses an interleave policy may be determined, for example, in connection with processing at step 106 of FIG. 4. An interleave factor may be specified as, for example, every other cylinder to every 32768 cylinders. The particular number of mirror devices servicing requests of a particular LV at a point in time may affect the number of preferred mirror devices selected in connection with performing processing steps of flowchart 100 of FIG. 4. In one embodiment, if an LV satisfies the following conditions, an interleaved policy is used for the LV:

1) the LV is the most active of all LVs residing on a physical mirror device, and more than twice as active as the second most active LV on the physical mirror device; and 2) the sequential I/O activity level of the LV is above a predetermined threshold. In the foregoing, the sequential I/O activity level refers to a percentage of prefetch activity over all read activity for the LV. The predetermined threshold may vary in accordance with each embodiment and may be specified in a variable that is updatable within an embodiment. For example, an embodiment may have a default threshold value of 60% that is updated at a subsequent time through use of a system parameter or variable. It should be noted that in one embodiment, once the interleaved mirror policy for an LV is determined, it is not modified during the next seek minimization step 108 processing of FIG. 4 flowchart 100.

Other embodiments may use different criteria in determining whether to use an interleave or other policy for an LV. Additionally, an embodiment may include other criteria and decisions besides specifying that an interleaved policy for an LV is in effect for a current and next subsequent iteration.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for selecting a mirror device from a plurality of mirror devices for a logical volume comprising:

collecting activity data of said at least one logical volume;

determining an activity level of each of said plurality of mirror devices;

selecting one of said plurality of mirror devices to service said logical volume in accordance with a load balancing policy of said mirror devices, said logical volume being one of a plurality of logical volumes; and performing seek minimization processing that includes swapping first and second mirror devices in accordance with predetermined criteria, said first mirror device being selected to service requests of a first logical volume and said second mirror device being selected to service requests of a second logical volume, said predetermined criteria including a first identifier associated with said first mirror device that does not correspond to a second identifier associated with a first portion of said first mirror device, said first portion identifying a location at which a mirrored portion of said first logical volume is to be stored, a third identifier associated with said second mirror device that does not correspond to a fourth identifier associated with a second portion of said second mirror device, said second portion identifying a location at which a mirrored portion of said second logical volume is to be stored, said third identifier corresponding to said second identifier.

2. The method of claim 1, wherein said predetermined criteria includes activity levels associated with said first and second logical volumes being approximately the same.

3. The method of claim 2, further comprising:

using a threshold value in determining whether the activity levels of said first and second logical volumes are approximately the same.

4. The method of claim 3, wherein said threshold value is dynamic and is modifiable periodically.

5. The method of claim 4, further comprising:

specifying a value for said threshold in a configuration file.

6. The method of claim 4, further comprising:

specifying a value for a location on each mirror device in said configuration file.

7. The method of claim 3, further comprising:

recalculating an assignment of mirror devices to logical volumes at a later time using new activity data collected during a time period subsequent to a prior assignment of said mirror devices to said logical volumes.

8. The method of claim 3, further comprising:

determining an activity level of a logical volume using statistics in connection with at least one of read operations, write operations, and prefetched data.

9. A method executed in a computer system for selecting a mirror device from a plurality of mirror devices for a logical volume comprising:

collecting activity data of said at least one logical volume;

determining an activity level of each of said plurality of mirror devices;

selecting one of said plurality of mirror devices to service said logical volume in accordance with a load balancing policy of said mirror devices, said logical volume being one of a plurality of logical volumes;

performing seek minimization processing that includes swapping first and second mirror devices in accordance with predetermined criteria, said first mirror device being selected to service requests of a first logical volume and said second mirror device being selected to service requests of a second logical volume, said predetermined criteria including a first identifier associated with said first associated mirror device that does not correspond to a second identifier associated with a location on said first mirror device identifying a location at which a mirrored portion of said first logical volume is to be stored and a third identifier associated with said second mirror device that does not correspond to a fourth identifier associated with a location on said second mirror device identifying a location at which a mirrored portion of said second logical volume is to be stored, and said third identifier corresponds to said second identifier, and activity levels associated with said first and second logical volumes being approximately the same;

using a threshold value in determining whether the activity levels of said first and second logical volumes are approximately the same;

determining an activity level of a logical volume using statistics in connection with at least one of read operations, write operations, and prefetched data; and determining said activity level of a particular logical device as:

(1*# of read requests+0.5*# of write requests++0.25*# of prefetched tracks)/(time of interval)

in which, for a predetermined amount of time represented as the "time of interval", "read requests" represents a number of read-miss accesses associated with said particular logical volume, "write requests" represents a number of write requests associated with said particular logical volume, and prefetched tracks represents a number of sequential read accesses associated with said particular logical device.

10. The method of claim 9, further comprising:

selecting, using said load balancing policy, a mirror device having a minimum activity level of said plurality of mirror devices.

11. The method of claim 10, further comprising:

determining an activity level associated with a mirror device by adding all activity levels of logical devices for which said mirror device is assigned to service.

12. The method of claim 1, said at least one logical volume is a plurality of logical volumes, and the method further includes:

sorting said plurality of logic at volumes in accordance with said activity data of each logical volume in decreasing order of activity level.

13. The method of claim 1, wherein said mirror device for a logical volume is dynamically determined and the method further comprises:

determining another mirror device for said logical volume at a predetermined point in time in response to at least one statistic about activity level of devices in said computer system.

14. A computer program product for selecting a mirror device from a plurality of mirror devices for a logical volume comprising machine executable code for:

collecting activity data of said at least one logical volume;

determining an activity level of each of said plurality of mirror devices;

selecting one of said plurality of mirror devices to service said logical volume in accordance with a load balancing policy of said mirror devices, said logical volume being one of a plurality of logical volumes; and performing seek minimization processing that includes swapping first and second mirror devices in accordance with predetermined criteria, said first mirror device being selected to service requests of a first logical volume and said second mirror device being selected to service requests of a second logical volume, said predetermined criteria including a first identifier associated with said first mirror device that does not correspond to a second identifier associated with a first portion of said first mirror device identifying a location at which a mirrored portion of said first logical volume is to be stored, a third identifier associated with said second mirror device that does not correspond to a fourth identifier associated with a second portion of said second mirror device identifying a location at which a mirrored portion of said second logical volume is to be stored, said third identifier corresponding to said second identifier.

15. The computer program product of claim 14, wherein said predetermined criteria includes activity levels associated with said first and second logical volumes being approximately the same.

16. The computer program product of claim 15, further comprising:

machine executable code using a threshold value in determining whether activity levels of said first and second logical volumes are approximately the same.

17. The computer program product of claim 16, wherein said threshold value is dynamic and is modifiable periodically.

18. The computer program product of claim 17, further comprising:

machine executable code for obtaining said threshold value from a configuration file.

19. The computer program product of claim 17, further comprising:

machine executable code for obtaining a value for a location on each mirror device from said configuration file.

20. The computer program product of claim 16, further comprising:

machine executable code for recalculating an assignment of mirror devices to logical volumes at a later time using new activity data collected during a time period subsequent to a prior assignment of said mirror devices to said logical volumes.

21. The computer program product of claim 16, further comprising:

machine executable code for determining an activity level of a logical volume using statistics in connection with at least one of read operations, write operations, and prefetched data.

22. A computer program product for selecting a mirror device from a plurality of mirror devices for a logical volume comprising machine executable code for:

collecting activity data of said at least one logical volume;

determining an activity level of each of said plurality of mirror devices;

selecting one of said plurality of mirror devices to service said logical volume in accordance with a load balancing policy of said mirror devices, said logical volume being one of a plurality of logical volumes; and performing seek minimization processing that includes swapping first and second mirror devices in accordance with predetermined criteria, said first mirror device being selected to service requests of a first logical volume and said second mirror device being selected to service requests of a second logical volume, said predetermined criteria including a first identifier associated with said first associated mirror device that does not correspond to a second identifier associated with a location on said first mirror device identifying a location at which a mirrored portion of said first logical volume is to be stored, a third identifier associated with said second mirror device that does not correspond to a fourth identifier associated with a location on said second mirror device identifying a location at which a mirrored portion of said second logical volume is to be stored, and said third identifier corresponds to said second identifier, and activity levels associated with said first and second logical volumes being approximately the same;

using a threshold value in determining whether activity levels of said first and second logical volumes are approximately the same;

determining an activity level of a logical volume using statistics in connection with at least one of read operations, write operations, and prefetched data; and determining said activity level of a particular logical device as:

$$(1*\text{\# of read requests}+0.5*\text{\# of write requests}++0.25*\text{\# of prefetched tracks})/(\text{time of interval})$$

in which, for a predetermined amount of time represented as the "time of interval", "read requests" represents a number of read-miss accesses associated with said particular logical volume, "write requests" represents a number of write requests associated with said particular logical volume, and prefetched tracks represents a number of sequential read accesses associated with said particular logical device.

23. The computer program product of claim 22, further comprising machine executable code for said load balancing policy selecting a mirror device having a minimum activity level of said plurality of mirror devices.

24. The computer program product of claim 23, further comprising machine executable code for:

determining an activity level associated with a mirror device by adding all activity levels of logical devices for which said mirror device is assigned to service.

25. The computer program product of claim 14, wherein said at least one logical volume is a plurality of logical volumes, and the computer program product further includes machine executable code for:

sorting said plurality of logical volumes in accordance with said activity data of each logical volume in decreasing order of activity level.

26. The computer program product of claim 14, further comprising:

machine executable code for dynamically determining said mirror device for said logical volume, and the computer program product further includes machine executable code for:

determining another mirror device for said logical volume at a predetermined point in time in response to at least one statistic about activity level of devices in said computer system.

27. The method of claim 1, wherein at least one of said first portion and said second portion identifies a portion of a mirror device within which a plurality of logical volumes are stored.

28. The method of claim 9, wherein said threshold value is dynamic and is modifiable periodically.

29. The method of claim 28, further comprising:
specifying a value for said threshold in a configuration file.

30. The method of claim 28, further comprising:
specifying a value for a location on each mirror device in said configuration file.

31. The method of claim 9, further comprising:
recalculating an assignment of mirror devices to logical volumes at a later time using new activity data collected during a time period subsequent to a prior assignment of said mirror devices to said logical volumes.

32. The computer program product of claim 14, wherein at least one of said first portion and said second portion identifies a portion of a mirror device within which a plurality of logical volumes are stored.

33. The computer program product of claim 22, wherein said threshold value is dynamic and is modifiable periodically.

34. The computer program product of claim 33, further comprising:
machine executable code that specifies a value for said threshold in a configuration file.

35. The computer program product of claim 33, further comprising:
machine executable code that specifies a value for a location on each mirror device in said configuration file.

36. The computer program product of claim 22, further comprising:
machine executable code that recalculates an assignment of mirror devices to logical volumes at a later time using new activity data collected during a time period subsequent to a prior assignment of said mirror devices to said logical volumes.

37. The method of claim 1, further comprising:
for said first of said plurality of logical volumes having said first identifier and said second identifier, determining if said first identifier corresponds to said second identifier;

if said first identifier does not correspond to said second identifier, determining for said second of said plurality of logical volumes having said third and said fourth identifiers, if said third identifier corresponds to said fourth identifier, if said second identifier corresponds to said third identifier, and if said activity levels of said first and second logical volumes are within a predetermined threshold; and if said third identifier does not correspond to said fourth identifier, said second identifier does correspond to said third identifier, and said activity levels of said first and second logical volumes are approximately the same, determining that said first mirror device is a preferred mirror device for said second logical volume and that said second mirror device is a preferred mirror device for said first logical volume.

38. The computer program product of claim 14, further comprising:
machine executable code that, for said first of said plurality of logical volumes having said first identifier and said second identifier, determines if said first identifier corresponds to said second identifier;

machine executable code that, if said first identifier does not correspond to said second identifier, determines for said second of said plurality of logical volumes having said third and said fourth identifiers, if said third identifier corresponds to said fourth identifier, if said second identifier corresponds to said third identifier, and if said activity levels of said first and second logical volumes are within a predetermined threshold; and machine executable code that, if said third identifier does not correspond to said fourth identifier, said second identifier does correspond to said third identifier, and said activity levels of said first and second logical volumes are approximately the same, determines that said first mirror device is a preferred mirror device for said second logical volume and that said second mirror device is a preferred mirror device for said first logical volume.

* * * * *